(12) United States Patent
Lungershausen

(10) Patent No.: US 9,187,137 B2
(45) Date of Patent: Nov. 17, 2015

(54) MOTOR VEHICLE BODY

(71) Applicant: GM GLOBAL TECHNOLOGY OPERATIONS LLC, Detroit, MI (US)

(72) Inventor: Dirk Rainer Lungershausen, Wiesbaden (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/530,221

(22) Filed: Oct. 31, 2014

(65) Prior Publication Data

US 2015/0115656 A1 Apr. 30, 2015

(30) Foreign Application Priority Data

Oct. 31, 2013 (DE) .......................... 10 2013 018 324

(51) Int. Cl.
| | |
|---|---|
| B62D 27/02 | (2006.01) |
| B62D 25/20 | (2006.01) |
| B62D 29/04 | (2006.01) |
| B62D 21/15 | (2006.01) |
| B62D 25/04 | (2006.01) |
| B62D 29/00 | (2006.01) |

(52) U.S. Cl.
CPC ............ B62D 27/023 (2013.01); B62D 21/157 (2013.01); B62D 25/04 (2013.01); B62D 25/2036 (2013.01); B62D 29/005 (2013.01); B62D 29/046 (2013.01)

(58) Field of Classification Search
CPC .. B62D 25/04; B62D 27/023; B62D 25/2036; B62D 29/046; B62D 21/157; B62D 29/005
USPC ................................. 296/187.12, 193.06, 209
See application file for complete search history.

(56) References Cited

U.S. PATENT DOCUMENTS

| | | | |
|---|---|---|---|
| 8,262,152 B2* | 9/2012 | Okumura et al. ......... | 296/193.06 |
| 8,608,232 B2* | 12/2013 | Engertsberger et al. . | 296/187.12 |
| 2006/0202513 A1* | 9/2006 | Matsuda ................... | 296/187.12 |

FOREIGN PATENT DOCUMENTS

| | | |
|---|---|---|
| DE | 10162825 A1 | 7/2003 |
| DE | 10309321 A1 | 10/2004 |
| DE | 102008032344 A1 | 1/2010 |
| DE | 102010001231 A1 | 7/2011 |
| JP | 2006312403 A | 11/2006 |
| JP | 2010111149 A | 5/2010 |
| JP | 2013010440 A | 1/2013 |

* cited by examiner

*Primary Examiner* — Joseph D Pape
(74) *Attorney, Agent, or Firm* — Ingrassia Fisher & Lorenz PC

(57) ABSTRACT

A motor vehicle body is disclosed which includes a structural element, a B-pillar fastened thereto, and a device for dissipating energy during a side impact event. The dissipation device include at least one torsion segment capable of plastic torsion caused by the rotation of the lower end of the B-pillar.

12 Claims, 1 Drawing Sheet

MOTOR VEHICLE BODY

CROSS REFERENCE TO RELATED APPLICATION

This application claims priority to German Patent Application No. 102013018324.3 filed Oct. 31, 2013, which is incorporated herein by reference in its entirety.

TECHNICAL FIELD

The present disclosure relates to a motor vehicle body with a B-pillar and a dissipation device for dissipating energy from a side impact, as well as to a motor vehicle, in particular to a passenger car, with such a motor vehicle body, and to a method for dissipating energy from a side impact involving such a vehicle.

BACKGROUND

DE 10 2010 001 231 A1 discloses a motor vehicle body with a rigid B-pillar made out of fiber-reinforced polymer material. The upper end of the B-pillar is joined with a rocker panel by means of an energy absorption device in such a way that, during a side impact on the B-pillar, at least a portion of the impact energy can be absorbed by a buckling in the plastic range or expansion of the energy absorption device.

SUMMARY

In one aspect, the present disclosure provides improved characteristics of a motor vehicle during a side impact. A portion of the body of a motor vehicle, such as a passenger car, includes a structural element and a B-pillar fastened thereto. Generally, the body includes two, B-pillars which are essentially a mirror-image of each other with identically constructed sides. To wit, only one side will be discussed below to provide a more compact description, but the explanations apply analogously to the other side. The structural element includes a lower or vehicle floor-side longitudinal and/or cross member, especially a rocker panel, which in a further development can be joined with an A- and/or C-pillar. The B-pillar is a body pillar, in particular one that is at least essentially parallel to the vertical axis of a vehicle, which viewed in the longitudinal direction of the vehicle is arranged between two additional body pillars, in particular an A- and C-pillar. If the body side includes more than three pillars, each of the pillars arranged between the two outermost pillars may be a referred to as a B-pillar. The structural element and/or B-pillar can be designed as a hollow profile in one embodiment.

In an embodiment, the B-pillar includes a fiber composite, in particular a plastic reinforced with carbon, glass and/or other fibers, such as a duroplastic, wherein the B-pillar is fabricated out of the latter in a further development. The structural element includes a metal material, in particular steel and/or a light metal material, such as an aluminum alloy. The structural element is fabricated out of the latter in a further development.

In particular these types of B-pillars can be very rigid. It may then be advantageous to dissipate at least some of the energy introduced into the vehicle from a side impact though means other than the B-pillar, in particular via fiber breaks in a fiber composite B-pillar, but also, for the most part, in some other way.

Accordingly, the motor vehicle body in an aspect of the present disclosure includes a dissipation device with one or more torsion segments for dissipating energy introduced into the vehicle, in particular the B-pillar, from a side impact, by means of torsion in the plastic range caused by the rotation of a lower or vehicle floor-side end of the B-pillar.

In an embodiment, dissipation via torsion in the plastic range, in particular based upon multi-axial shear stresses, can advantageously be used in place of dissipation via an essentially uniaxial stress state of the kind encountered during plastic expansion or buckling. In an embodiment, the torsion can thus be preset and/or guided more easily and/or precisely, thereby improving how the dissipation characteristics are set. Additionally or alternatively, a plastic torsion can yield a more favorable material stress. Additionally or alternatively, the deformation path can be improved.

In particular to impress torsional moments, the B-pillar can be fastened to the structural element by a lever, which is joined with the lower end of the B-pillar and the structural element. The lever can exhibit two or more legs and a yoke that joins the legs, wherein the lower end of the B-pillar is joined with the yoke, and the structural element is joined with the legs. In an embodiment, the legs are situated on both sides as well as in front and in back of the B-pillar in the longitudinal direction of the vehicle. In this way, the B-pillar can be supported on both sides in an embodiment, making it possible to advantageously impress torsional moments.

In an embodiment, the lower end of the B-pillar can be pivoted to the yoke. In particular, the lower end can be (rotatably) hinged to the yoke, especially by means of a slide bearing. To this end, a center of the B-pillar envelops or encompasses the yoke in one embodiment, which can be especially advantageous from the standpoint of production and/or strength. In an embodiment, the slide bearing can be materially fixed in place, in particular through welding, adhesive bonding or the like such that the connection can be destroyed as a result of a side impact, which additionally dissipates energy. Additionally or alternatively, one or more legs, in particular situated on either side of the B-pillar, can be pivoted to the structural element in an embodiment. In particular, a leg can be (rotatably) hinged to the structural element, especially by means of a slide bearing, in particular through welding, adhesive bonding or the like such that the connection can be destroyed as a result of a side impact, which additionally dissipates energy. In like manner, the legs of the lever can be integrally designed with the structural element, in particular via primary shaping.

A torsion segment can be designed in various ways. In an embodiment, at least one torsion segment of the dissipation device is situated at a transition between the lever and structural element, and in a further development, a torsion segment is situated at the transition between a leg of the lever and the structural element, while another torsion segment is situated at a transition between another leg of the lever and the structural element. As a consequence, a local plastic torsion can be impressed at the transition or transitions in an embodiment, so that the lever can rotate in relation to the structural element in a further development.

Additionally or alternatively, one or more torsion segments of the dissipation device situated on either side of the B-pillar, can be spaced apart from the B-pillar in the longitudinal direction of the vehicle by at least a respective 25%, especially by at least 30% of a length of the structural element. Additionally or alternatively, one or more torsion segments of the dissipation device, in particular situated on either side of the B-pillar, can be spaced apart from the B-pillar in the longitudinal direction of the vehicle by at least a respective 50%, especially at least 75% of a distance between the B-pillar and an adjacent body pillar, in particular an A- or C-pillar.

In an embodiment, this makes it possible to impress a local plastic torsion near the A- and/or C-pillar, allowing the structural element to also partially rotate in a further development.

Additionally or alternatively, a flexural rigidity for the lever, in particular the leg, can measure at least or at most 50%, in particular at least 75% or at most 25%, of a flexural rigidity of the B-pillar. In other words, the lever, in particular its legs, can be made relatively rigid or relatively flexible in design. In an embodiment, a relatively rigid lever whose flexural rigidity measures at least 50%, in particular at least 75%, of the flexural rigidity of the B-pillar can advantageously rotate as a whole or essentially as a rigid body, and thereby advantageously guide in particular the lower end of the B-pillar. In an embodiment, a relatively flexible lever whose flexural rigidity measures at most 50%, in particular at most 25%, of the flexural rigidity of the B-pillar can advantageously be deformed, in particular twisted between the yoke and leg(s), and thereby especially dissipate energy.

In an embodiment, one or more legs situated on either side of the B-pillar, are bent in the longitudinal direction of the vehicle, especially oppositely, in particular to illustrate an advantageous deformation characteristic and/or an advantageous binding of the B-pillar to the structural element.

In an embodiment, a torsion segment of the dissipation device can in particular be designed to have locally reduced torsion rigidity. To this end, the torsion segment can exhibit a locally reduced modulus of shear and/or locally reduced (polar) area moment of inertia, in particular a locally reduced wall thickness, or be designed as or defined by the latter. In an embodiment, a torsion segment, in particular one designed to have locally reduced torsion rigidity, can be integrally designed with the structural element or lever, especially by way of a local wall thickness reduction, as explained above. In like manner, a torsion segment designed to have locally reduced torsion rigidity, can in one embodiment take the form of a separate component, which can be joined in a torque-proof way with the structural element and/or lever, especially at a transition between the structural element and lever or between two torsionally more rigid segments of the structural element, in particular positively, non-positively or materially, for example via latching, clamping, welding, adhesive bonding or the like.

In an embodiment, the B-pillar is pivoted around a roof structural element such as a roof longitudinal member. As a result, a well-defined pivoting kinematics can be established for the lower end of the B-pillar in an embodiment, thus making it possible to advantageously design the plastic torsion owing to a rotation of this lower end and the resultant energy dissipation. In particular, the B-pillar can be (rotatably) hinged to the roof structural element, especially by means of a slide bearing. In like manner, it can also be fixedly secured to the roof structural element, and pivoted through local deformation by a bending of the B-pillar and/or torsion of the roof structural element.

In an aspect of the present disclosure, energy introduced into a motor vehicle as a result of a side impact involving the latter, in particular into its B-pillar, is at least partially dissipated by or during exposure to plastic torsion of a dissipation device, which is caused by a rotation of the lower end of the B-pillar.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
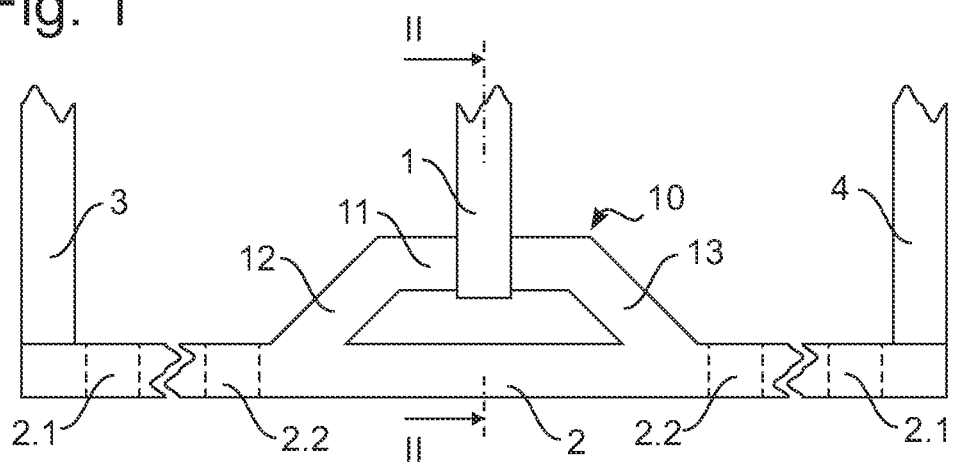
FIG. 1 is a side view depicting part of the body of a motor vehicle according to an embodiment of the present disclosure.
Figure 2:
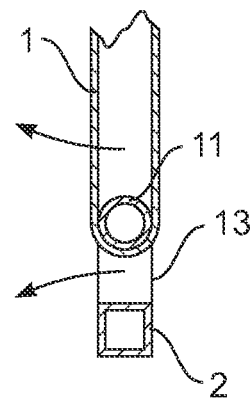
FIG. 2 is a section along line II-II on FIG. 1

FIGS. 1 and 2 provide a side view or section depicting a portion of the body of a motor vehicle according to an embodiment of the present disclosure. The body includes a structural element in the form of a rocker panel 2, which is joined with an A-pillar 3 and a C-pillar 4. A B-pillar is fastened to the rocker panel 2. The B-pillar 1 and structural element 2 are designed as a hollow profile, wherein the B-column 1 is made out of a fiber composite, in particular CFK, and the rocker panel 2 out of metal.

The B-column 1 is fastened to the structural element 2 by a lever 10, which is joined with a lower end of the B-pillar and the structural element. The lever 10 includes two legs 12, 13 and a yoke 11 joining the legs 12, 13, wherein the lower end of the B-pillar is joined with the yoke 11, and the rocker panel 2 with the legs 12, 13, which are situated on both sides or in front and in back of the B-pillar 1 in the longitudinal direction of the vehicle (horizontally on FIG. 1), and also oppositely bent in the longitudinal direction of the vehicle. The lower end of the B-pillar 1 is rotatably hinged to the yoke 11 by means of a slide bearing. To this end, an eye of the CFK B-pillar 1 envelops or encompasses the yoke 11. The legs 12, 13 of the lever 10 are integrally designed with the rocker panel 2, in particular via primary shaping.

In particular to dissipate energy introduced into the B-pillar 1 of the vehicle from a side impact, the motor vehicle body includes a dissipation device with one or more torsion segments, which plastically twist or are plastically twisted owing to a rotation of the lower end of the B-pillar.

To provide a more compact view, FIG. 1 depicts several different torsion segments together, wherein one or more of these torsion segments can be omitted in one modification, and/or the dissipation device can exhibit one or more additional torsion segments that are not shown. The dissipation device in the embodiment depicted includes two torsion segments 2.2 situated on either side of the B-pillar 1 at the transitions between the legs 12, 13 of the lever 10 and the rocker panel 2. The dissipation device in the embodiment depicted also includes two torsion segments 2.1 situated on either side of the B-pillar 1 in proximity to the A- or C-pillar 3, 4, which are thus each spaced apart from the B-pillar 1 in the longitudinal direction of the vehicle by at least 30% of a length of the rocker panel and at least 75% of a distance between the B-pillar 1 and adjacent A- or C-pillar 3, 4.

Torsion segments 2.1, 2.2 are designed with a locally reduced torsion rigidity resulting from a locally reduced wall thickness. They can be integrally designed with the rocker panel 2 or take the form of separate components, which are joined with the rocker panel 2 in a torque-proof manner. Especially in such torsion segments 2.1, 2.2, the legs 12, 13 can be relatively rigid in design, so that the lever 10 rotates as a whole or essentially as a rigid body. In like manner, the legs 12, 13 can be relatively flexible in design, so that the lever 10 plastically twists or is plastically twisted between the yoke 11 and legs 12, 13. At its upper end not shown on the figures, the B-pillar 1 is pivoted around a roof structure element in the form of a roof longitudinal member.

If energy from a side impact of the motor vehicle is introduced into the B-pillar 1, in particular the lower end of the latter pivots around the roof longitudinal member, as denoted on FIG. 2 by a clockwise motion arrow. This also causes the lever 10 to rotate, as denoted on FIG. 2 by the counterclockwise motion arrow. This rotation impresses a torsion moment on the rocker panel 2 that makes the torsion segments 2.1, 22 and/or the lever 10 undergo plastic torsion. This at least partially dissipates the energy.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A motor vehicle body comprising:
   a structural element;
   a B-pillar fastened to the structural element; and
   a dissipation device having at least one torsion segment operably coupled to a lower end of the B-pillar, wherein displacement of the lower end of the B-pillar from a side impact event causes plastic torsion of the at least one torsion segment for dissipating energy, wherein the dissipation device further comprises a lever joined with the lower end of the B-pillar and the structural element, and
   wherein the lever comprises at least two legs and a yoke joining the legs, wherein the lower end of the B-pillar is joined with the yoke, and the structural element is joined with the legs.

2. The motor vehicle body according to claim 1, wherein the B-pillar comprises a fiber composite.

3. The motor vehicle body according to claim 1, wherein a flexural rigidity of the lever is no more than 75% of a flexural rigidity of the B-pillar.

4. The motor vehicle body according to claim 3, wherein the flexural rigidity of the lever is about 50% of the flexural rigidity of the B-pillar.

5. The motor vehicle body according to claim 1, wherein at least one leg is bent in the longitudinal direction of the vehicle.

6. The motor vehicle body according to claim 1, wherein the at least one torsion segment of the dissipation device is situated at a transition between the lever and structural element.

7. The motor vehicle body according to claim 1, wherein the at least one torsion segment of the dissipation device is spaced apart from the B-pillar in the longitudinal direction of the vehicle by at least 25% of the length of the structural element.

8. The motor vehicle according to claim 1, wherein the at least one torsion segment of the dissipation device comprising a section having a locally reduced torsion rigidity.

9. The motor vehicle according to claim 1, wherein the structural element comprises a rocker panel.

10. The motor vehicle body according to claim 1, wherein the B-pillar is configured to rotate around a roof structural element during the side impact event.

11. A motor vehicle in the form of a passenger car comprising the motor vehicle body according to claim 1.

12. A method for dissipating energy from a side impact of a motor vehicle according to claim 11 and further comprising rotating the lower end of the B-pillar thereby causing plastic torsion of the dissipation device.

* * * * *